United States Patent Office 3,408,550
Patented Oct. 29, 1968

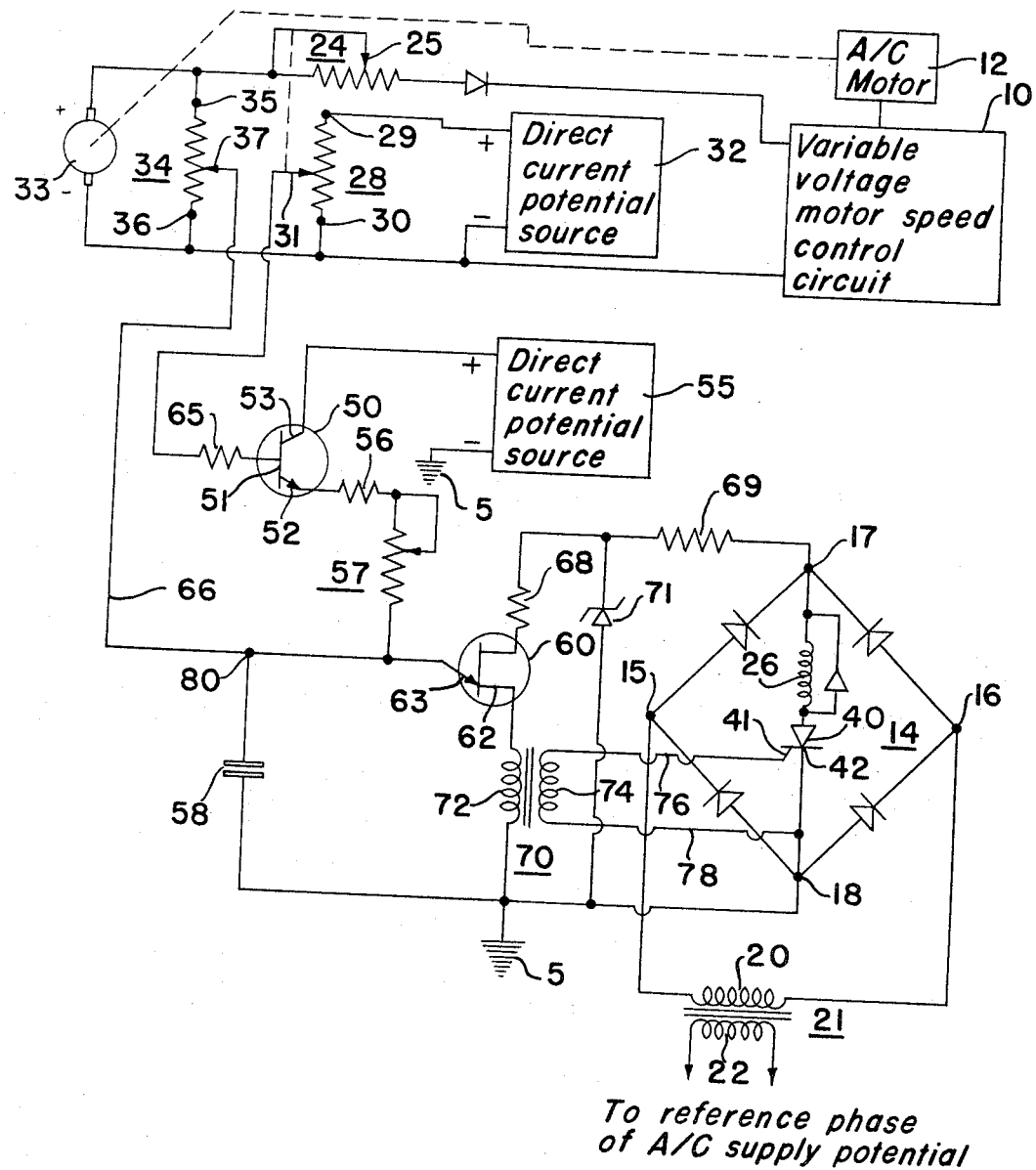
INVENTOR.
Donald E. Graham
BY Richard G. Stahr
His Attorney

3,408,550
DYNAMIC BRAKING SYSTEM FOR ALTERNATING CURRENT INDUCTION TYPE MOTORS
Donald E. Graham, Dayton, Ohio, assignor to General Motors Corporation, Detroit, Mich., a corporation of Delaware
Filed Jan. 11, 1966, Ser. No. 519,988
2 Claims. (Cl. 318—212)

ABSTRACT OF THE DISCLOSURE

A system for dynamically braking an alternating current induction type motor, the speed of which is controlled by a variable voltage motor speed control system which includes a motor speed control potentiometer. Respective potentiometers are connected in shunt across a source of direct current reference potential and a direct current tachometer generator driven by the motor, the movable contact of the potentiometer connected across the source of reference potential being mechanically interlocked with the movable contact of the motor speed control potentiometer. Upon an adjustment of the motor speed control potentiometer movable contact to change motor speed, a difference potential signal appears across the movable contacts of the potentiometers connected across the source of reference potential and the tachometer generator which activates responsive circuitry to complete an energizing circuit for a separate brake winding wound upon the stator of the motor across a separate source of direct current brake potential.

---

This invention relates to braking systems for electrical motors and, more specifically, to a dynamic braking system for alternating current induction type motors.

With variable voltage speed control systems for alternating current induction type motors, the speed of the motor is controlled by adjusting a motor speed control device which controls the time during which full line potential is applied to the motor by varying the conduction angle of a selected phase or phases of the alternating current supply potential. To increase motor speed, the time during which full line potential is applied to the motor is increased by increasing the conduction angle and to reduce motor speed, the time during which full line potential is applied to the motor is reduced by reducing the conduction angle. Therefore, when speed control systems of this type are adjusted to reduce the speed of the motor, the speed of the rotor of the motor does not reduce in proportion to the adjustment of the motor speed control device because of rotor inertia.

For precise and accurate speed adjustment of alternating current induction motors which are controlled by variable voltage speed control systems, it is necessary that the rotor speed reduces with the adjustment of the motor speed control device so that the rotor is always rotating at substantially the speed corresponding to the setting of the system motor speed control device. Therefore, a system which dynamically brakes the rotor of a variable voltage controlled induction motor, in response to an adjustment of the motor speed control device of the variable voltage motor speed control system to reduce the speed of the motor, is highly desirable.

It is, therefore, an object of this invention to provide an improved braking system for alternating current induction type motors.

It is another object of this invention to provide an improved dynamic braking system for alternating current induction type motors.

It is a further object of this invention to provide an improved dynamic braking system for alternating current induction type motors which is responsive to an adjustment of the variable voltage motor speed control system to reduce the speed of the motor.

In accordance with this invention, a dynamic braking system for alternating current induction type motors is provided wherein a brake winding, wound upon the stator of the motor, is energized by a source of direct current brake potential in response to a difference signal which is produced upon the adjustment of a variable voltage motor speed control system to reduce the speed of the motor.

For a better understanding of the present invention, together with additional objects, advantages and features thereof, reference is made to the following description and accompanying single figure drawing.

Referring to the figure, the novel dynamic braking system for alternating current induction type motors of this invention is set forth in schematic form. As the variable voltage speed control system and controlled alternating current induction type motor with which the novel dynamic braking system of this invention may be used may be any of the several well known in the art and form no part of this invention, each has been illustrated in the figure in block form and referenced by the numerals 10 and 12, respectively.

In a practical application, the novel dynamic braking system of this invention was used in combination with the variable voltage motor speed control system described in copending application Ser. No. 493,652 which was filed Oct. 7, 1965 and assigned to the same assignee.

As the point of reference or ground potential is the same point electrically throughout the system, it has been illustrated by the accepted symbol and referenced by the numeral 5 throughout the figure.

The novel dynamic braking system of this invention operates, in response to a difference signal which is produced upon the adjustment of the variable voltage motor speed control system to reduce the speed of a controlled motor, to energize a brake winding wound upon the stator of the motor by a source of direct current brake potential.

The source of direct current brake potential, shown in schematic form in the figure and referenced generally by the numeral 14, may include a full wave diode bridge type rectifier having two alternating current input terminals 15 and 16 and two direct current output terminals 17 and 18. Brake winding 26 is connected across direct current output terminals 17 and 18 and alternating current input terminals 15 and 16 are connected across the secondary winding 20 of transformer 21, the primary winding 22 of which may be connected across a reference phase of the alternating current supply potential for motor 12. It is to be specifically understood that alternate direct current potential sources may be employed as the source of brake potential without departing from the spirit of the invention.

The motor speed control device of the variable voltage motor speed control system which may be adjusted to control the speed of motor 12 may be a motor speed control potentiometer shown in the figure as a conventional potentiometer 24 having a movable contact 25.

Motor speed control potentiometer 24 is usually included in the variable voltage motor speed control system and brake winding 26 is wound upon the stator of the controlled alternating current motor, however, motor speed control potentiometer 24 and brake winding 26 have been schematically illustrated in the figure externally of variable voltage motor speed control circuit 10 and motor 12, respectively, to facilitate the description of the novel dynamic braking system of this invention.

The difference signal which is produced in response to an adjustment of the variable voltage motor speed control system to reduce the speed of a controlled motor may be the difference in magnitude between a reference potential, the magnitude of which is changed in response to an adjustment of the control system motor speed control device to reduce the speed of the motor, and a control potential, the magnitude of which varies with motor speed.

To provide the reference potential, a conventional potentiometer 28 may be connected in shunt across the positive and negative polarity terminals of a source of direct current reference potential 32 through end terminals 29 and 30, respectively. As this source of reference potential may be any source of direct current potential well known in the art and forms no part of this invention, it has been illustrated in block form in the figure. Movable contact 25 of motor speed control potentiometer 24 may be mechanically interlocked with movable contact 31 of potentiometer 28 in such a manner that, upon an adjustment of movable contact 25 to reduce the speed of motor 12, movable contact 31 is adjusted in a direction away from end contact 29 toward end contact 30, in a manner well known in the art.

To provide a control potential which varies with motor speed, an electric tachometer which may be driven by the motor shaft and which produces a direct current output potential, the magnitude of which is proportional to motor speed, may be employed. Commercially available tachometers of this type are small direct current generators which are designed to produce an output direct current potential which increases and decreases linearly with increases and decreases of motor speed. These devices are adapted to be mounted upon the end bell of the motor housing in such a manner that the armature thereof is rotated by the motor shaft. As electrical tachometers of this type are well known in the art and form no part of this invention, it has been schematically illustrated as a circle in the figure and referenced by the numeral 33. A conventional potentiometer 34 is connected in shunt across the output terminals of tachometer 33 through end terminals 35 and 36.

Movable contacts 31 and 37 of potentiometers 28 and 34, respectively, are adjusted relative to each other to produce equal potentials between movable contact 31 and fixed contact 30 of potentiometer 28 and movable contact 37 and fixed contact 36 of potentiometer 34 at a selected motor speed which may be synchronous speed or any other speed less than synchronous speed.

Upon the adjustment of movable contact 25 of motor speed control potentiometer 24 in a direction to reduce the speed of motor 12, mechanically interlocked movable contact 31 of potentiometer 28 is moved in a direction toward fixed contact 30 and a difference signal appears across movable contacts 31 and 37 which is of a positive polarity upon movable contact 37 relative to the potential upon movable contact 31 because movable contact 31 has been adjusted in a direction toward the negative terminal of source of reference potential 32.

To energize brake winding 26 by the source of direct current brake potential 14, circuitry responsive to the difference signal produced by the arrangement hereinabove described for establishing an energizing circuit for brake winding 26 across source of direct current brake potential 14 is provided.

Connected in series with brake winding 26 across the direct current output terminals 17 and 18 of brake potential source 14 is a controllable switching device, having two current carrying electrodes and a control electrode, of the type which may be triggered to conduction upon the application of a control signal across the control electrode and one of the current carrying electrodes thereof. In the figure, this controllable switching device is illustrated as a silicon controlled rectifier 40, the current carrying electrodes of which are connected in series with braking winding 26, however, it is to be specifically understood that alternate controllable switching devices having similar electrical characteristics may be substituted therefor.

The silicon controlled rectifier is a semiconductor device having a control electrode, generally termed the gate electrode, and two current carrying electrodes, generally termed the anode and cathode electrodes, which is designed to normally block current flow in either direction. With the anode and cathode electrodes forward poled, anode positive and cathode negative, the silicon controlled rectifier may be triggered to conduction upon the application, to the control electrode, of a control potential signal of a polarity which is positive in respect to the potential present upon the cathode electrode and of sufficient magnitude to produce control electrode-cathode, or gate, current. In the conducting state, the silicon controlled rectifier will conduct current in one direction and retains the ability to block current flow in the opposite direction. In the conducting state, therefore, the silicon controlled rectifier functions as a conventional diode. Upon being triggered to conduction, however, the control electrode is no longer capable of affecting the device which will remain in the conducting state until either the anode-cathode circuit is interrupted or the polarity of the potential applied across the anode-cathode electrodes is reversed.

As the anode electrode of silicon controlled rectifier 40 is connected to the positive polarity terminal 17 of braking potential source 14 through braking winding 26 and the cathode electrode 42 is connected to the negative polarity terminal 18, this device is forward poled.

The difference signal may be applied directly across the control electrode 41 and cathode electrode 42 of silicon controlled rectifier 40 by connecting movable contact 37 of potentiometer 34 to control electrode 41 and movable contact 31 of potentiometer 28 to the cathode electrode 42.

With these connections, the difference signal is of the proper polarity relationship, positive upon movable contact 37 in respect to movable contact 31, to produce gate current flow through silicon controlled rectifier device 40. Therefore, this device is triggered to conduction and establishes an energizing circuit for brake winding 26 across the direct current output terminal 17 and 18 of source of direct current brake potential 14, upon the adjustment of movable contact 25 of motor speed control potentiometer 24 to reduce the speed of motor 12.

It has been found, however, that more precise and reliable operation of the novel dynamic braking system of this invention may be realized by the inclusion of intermediate circuitry responsive to the difference signal for producing a control signal which is applied across the gate electrode 41 and cathode electrode 42 of silicon controlled rectifier 40 to trigger this device to conduction in response to the difference signal. This intermediate circuitry includes type NPN transistor 50, unijunction transistor 60 and the associated circuitry.

Type NPN transistor 50 has the usual control electrode, base electrode 51, and two current carrying electrodes, emitter electrode 52 and collector electrode 53.

To apply the difference signal across the control electrode and one of the current carrying electrodes of transistor 50, movable contact 37 of potentiometer 34 is connected to the base electrode 51 through current limiting resistor 65 and movable contact 31 of potentiometer 28 is connected to the emitter electrode 52 through lead 66, potentiometer 57 and resistor 56.

The current carrying electrodes, collector electrode 53 and emitter electrode 52, of transistor 50 are connected in series with a capacitor 58 across the positive and negative polarity terminals, respectively, of a direct current potential source 55 which, since it may be any of several direct current potential sources well known in the art and forms no part of this invention, has been shown in the figure in block form. This circuit may be traced from the positive polarity terminal of direct current potential source 55 through the collector-emitter electrode of transistor 50, resistor 56, potentiometer 57, capacitor 58 and point of reference or ground potential 5 to the negative polarity terminal of direct current potential source 55.

Unijunction transistor 60 includes two base electrodes 61 and 62 and an emitter electrode 63. Emitter electrode 63 is connected to junction 80 between emitter electrode 52 of transistor 50 and capacitor 58. Base electrodes 61 and 62 are connected in series with primary winding 72 of transformer 70 across the source of direct current brake potential 14. This circuit may be traced from positive polarity output terminal 17, through resistor 69, resistor 68, bases 61 and 62 of unijunction transistor 60, primary winding 72 and point of reference or ground potential 5 to negative polarity terminal 18. Zener diode 71 tends to stabilize the potential across base 61 and 62 of unijunction transistor 60.

Secondary winding 74 of transformer 70 is connected across control electrode 41 and cathode electrode 42 of silicon controlled rectifier 40 through leads 76 and 78, respectively.

Upon the adjustment of movable contact 25 of motor speed control potentiometer 24 in a direction to reduce the speed of motor 12, the resulting difference signal appearing across movable contacts 37 and 31 of respective potentiometers 34 and 28 is applied across the base-emitter electrodes of transistor 50. As this difference signal is of a positive polarity upon movable contact 37 of potentiometer 34 in respect to the polarity of the potential upon movable contact 31 of potentiometer 28, this difference signal is of the proper potential polarity relationship to produce base-emitter current flow through a type NPN transistor. Therefore, transistor 50 conducts and establishes an energizing circuit for capacitor 58 from the positive polarity terminal of potential source 55, through the collector-emitter electrodes of transistor 50, resistor 56, potentiometer 57, capacitor 58 and point of reference or ground potential 5 to the negative polarity terminal of potential source 55. The charge upon capacitor 58 is applied across the emitter 63-base 62 electrodes of unijunction transistor 60.

The unijunction transistor is a semiconductor device having two base electrodes and an emitter electrode which is characterized by a high emitter to base resistance with an applied emitter potential of a magnitude less than the peak point voltage. With an applied emitter potential of a magnitude equal to or greater than the peak point voltage, the unijunction transistor switches to a low resistance state. The magnitude of the peak point voltage required to switch a unijunction transistor to the low resistance state is determined by the intrinsic standoff ratio of peak point voltake. With an applied emitter potential of the device. While the value of the intrinsic standoff ratio varies with different unijunction transistor types, it generally falls within the range of .50 to .75. The peak point voltage is substantially the product of the interbase potential multiplied by the intrinsic standoff ratio of the unijunction transistor being used. Therefore, the peak point voltage may vary between ½ and ¾ of the interbase potential, depending upon the characteristics of the device. After being triggered to conduction, the unijunction transistor spontaneously extinguishes itself when the potential applied to the emitter electrode is reduced to a specific magnitude less than the peak point voltage.

When the charge upon capacitor 58 reaches a magnitude substantially equal to the peak point voltage of unijunction transistor 60, this device switches to its low resistance state and capacitor 58 discharges through the emitter 63-base 62 junction of unijunction transistor 60 and primary winding 72 of transformer 70. This capacitor 58 discharge current flow through primary winding 72 induces a control signal in secondary winding 74, in a manner well known in the art. Transformer windings 72 and 74 are poled in such a manner that the end of secondary winding 74 connected to the control electrode 41 of silicon controlled rectifier 40 is of a positive polarity during the flow of capacitor 58 discharge current through primary winding 72.

This control signal is applied across the control electrode 41 and the cathode electrode 42 of silicon controlled rectifier 40 through lines 76 and 78, respectively. Therefore, silicon controlled rectifier is triggered to conduction to establish an energizing circuit for brake winding 26 across the direct current output terminals 17 and 18 of brake potential source 14 in response to the difference signal appearing across movable contacts 31 and 37 of respective potentiometers 28 and 34.

With brake winding 26 energized, the rotor of motor 12 is dynamically braked in a manner well known in the art and, therefore, the speed of the rotor of motor 12 tends to closely follow the adjustment of movable contact 25 of motor speed control potentiometer 24.

Upon the discharge of capacitor 58 through the circuit hereinabove described, unijunction transistor 60 spontaneously extinguishes when the potential across capacitor 58 falls to a specific value below the peak point voltage of unijunction transistor 60 and capacitor 58 again begins to charge through the charging circuitry previously described so long as a different signal appears across movable contacts 37 and 31 of respective potentiometers 34 and 28.

At the end of each half cycle of the alternating current supply potential, the direct current potential appearing across direct current output terminals 17 and 18 of brake potential source 14 goes to zero and, therefore, extinguishes silicon controlled rectifier 40.

As long as a difference potential appears across movable contacts 37 and 31 of respective potentiometers 34 and 28 the cycle hereinabove described repeats to apply dynamic brake energizing current to brake winding 26.

As the speed of motor 12 reduces, the magnitude of the direct current output potential of tachometer 33 also reduces until the potential across movable contacts 37 and 31 of respective potentiometers 34 and 28 reaches a state of equilibrium. At this time, the difference signal is removed from the base-emitter electrodes of transistor 50 and this transistor goes nonconductive. Therefore, motor 12 rotates at the speed determined by the setting of movable contact 25 of motor speed control rheostat 24.

Upon the adjustment of movable contact 25 of motor control rheostat 24 to increase the speed of motor 12, the polarity of the difference signal appearing across movable contacts 37 and 31 of respective potentiometers 34 and 31 reverses in that movable contact 31 is adjusted in a direction toward the positive polarity terminal of direct current reference potential source 32. Under these conditions, the difference signal, which is of a negative polarity upon movable contact 37 in respect to the potential upon movable contact 31, applied across the base-emitter electrodes of transistor 50 does not satisfy the base-emitter bias requirement for conduction through a type NPN transistor. Therefore, transistor 50 remains nonconductive during the adjustment of movable contact 25 of motor speed control rehostat 24 to increase the speed of motor 12 and the dynamic braking system of this invention is inoperative.

Upon the adjustment of movable contact 25 of motor speed control potentiometer 24 in a direction to again reduce the speed of motor 12, the dynamic braking system of this invention operates in the manner just described to energize braking winding 26.

Throughout this specification, specific polarities and transistor types have been set forth to facilitate the description. It is to be specifically understood that alternate polarities and compatible transistor devices may be employed without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. A dynamic braking system for alternating current induction type motors comprising in combination with a variable voltage motor speed control system including a motor speed control potentiometer having a movable contact and an associated controlled alternating current induction type motor, a source of direct current brake potential, a brake winding wound upon the stator of said motor, a source of direct current reference potential, a direct current tachometer generator driven by said motor, a first potentiometer having two end terminals and a movable contact, means for connecting said end terminals of said first potentiometer in shunt across said source of direct current reference potential, a second potentiometer having two end terminals and a movable contact, means for connecting said end terminals of said second potentiometer in shunt across said direct current tachometer generator, means for mechanically interlocking said movable contacts of said motor speed control potentiometer and said first potentiometer, and means responsive to a difference signal appearing across said movable contacts of said first and second potentiometers for establishing an energizing circuit for said brake winding across said source of direct current brake potential.

2. A static braking system for alternating current induction type motors as described in claim 1 wherein said means responsive to said difference signal for establishing an energizing circuit of said brake winding across said source of direct current brake potential comprises a transistor device having two current carrying electrodes and a control electrode, means for applying said difference signal across said control electrode and one of said current carrying electrodes of said transistor device, a capacitor, a source of direct current potential, means for connecting said current carrying electrodes of said transistor device and said capacitor in series across said source of direct current potential, a transformer having primary and secondary windings, a unijunction transistor device having two base electrodes and an emitter electrode, means for connecting said emitter electrode to a junction between said current carrying electrodes of said transistor device and said capacitor, means for connecting said base electrodes of said unijunction transistor device and said primary winding of said transformer in series across said source of direct current brake potential, a controllable switching device having two current carrying electrodes and a control electrode of the type which may be triggered to conduction upon the application of a control signal across said control electrode and one said current carrying electrodes of said controllable switching device in series with said brake winding across of said current carrying electrodes, means for connecting said source of direct current brake potential and means for connecting said secondary winding of said transformer across said control electrode and one of said current carrying electrodes of said controllable switching device.

References Cited

UNITED STATES PATENTS 3,090,901    5/1963    Shaw   ---------- 318—302 XR
3,250,975    5/1966    Pepper   --------- 318—302 XR ORIS L. RADER, *Primary Examiner.*

G. RUBINSON, *Assistant Examiner.*

UNITED STATES PATENT OFFICE
CERTIFICATE OF CORRECTION

Patent No. 3,408,550                                                           October 29, 1968

Donald E. Graham

It is certified that error appears in the above identified patent and that said Letters Patent are hereby corrected as shown below:

Column 5, line 47, cancel "peak point voltage. With an applied emitter potential of". Column 7, line 24, "of" should read -- for --. Column 8, line 8, beginning with "transistor device" cancel all to and including "transistor" in line 10, same column 8 and insert -- transistor device and said capacitor, means for connecting said base electrodes of said unijunction transistor device and said primary winding of said transformer in --; line 16, beginning with "said current" cancel all to and including "for connecting" in line 18, same column 8 and insert-- of said current carrying electrodes, means for connecting said current carrying electrodes of said controllable switching device in series with said brake winding across --.

(SEAL)              Signed and sealed this 10th day of March 1970.

Attest:

Edward M. Fletcher, Jr.                        WILLIAM E. SCHUYLER, JR.

Attesting Officer                                                Commissioner of Patents